Jan. 10, 1961  G. L. STEVENS  2,967,745
PISTON RING GROOVE SPACER
Filed March 17, 1960
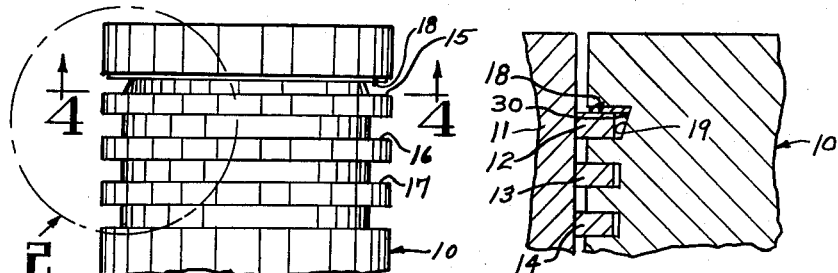
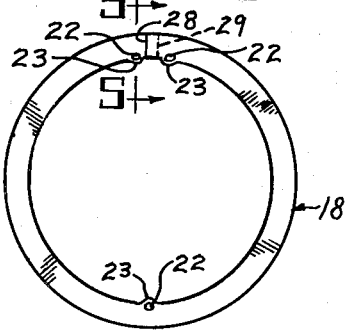
Fig. 3
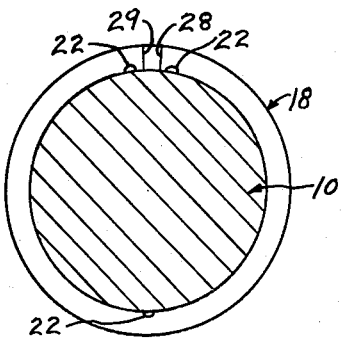
Fig. 4
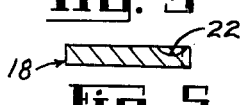
Fig. 5
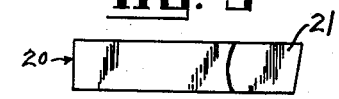
Fig. 7
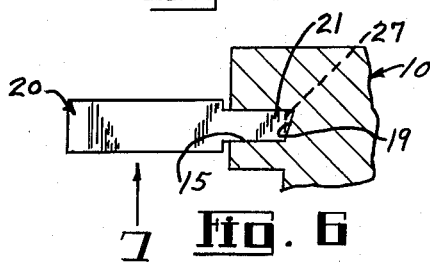
Fig. 6
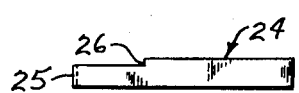
Fig. 8
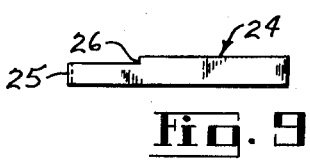
Fig. 9
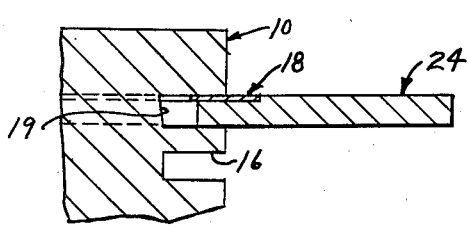
Fig. 10
INVENTOR.
GUY L. STEVENS
BY
Donnelly, Mentag & Harrington
ATTORNEYS

United States Patent Office 2,967,745
Patented Jan. 10, 1961

2,967,745

PISTON RING GROOVE SPACER

Guy L. Stevens, 40300 Grand River Ave., Novi, Mich.

Filed Mar. 17, 1960, Ser. No. 15,619

3 Claims. (Cl. 309—44)

This invention relates to improvements in the piston art, and more particularly to a novel method of re-sizing the piston ring grooves in a piston and a piston provided with a novel piston groove spacer in accordance with the invention.

It is well known that when an internal combustion engine is operating, the rings on the piston thereof will move longitudinally from the lower sides of their respective grooves to the top sides thereof and vice versa. Since the rings are always mounted in their grooves with a slight play or clearance on the opposite sides thereof, the quick reciprocation of the rings in their grooves causes the grooves to wear and become widened with a consequent loss of sealing efficiency between the cylinder walls and the piston. The piston rings are normally made of a harder material than the piston and this difference in material increases the tendency of the rings to widen their respective ring grooves during reciprocation of the piston.

The patent to Ballard, No. 2,415,984 suggests a method and means for re-sizing a piston ring groove by providing a spacer ring on the upper side thereof. However, one disadvantage of the Ballard method for re-sizing the piston ring groove is that an annular groove is required to be cut into the upper end of the bottom face of the ring groove and this annular groove forms a point of weakness in the piston. A second disadvantage of the Ballard method is that a special cutter is required to form the aforementioned annular groove and this makes the Ballard method expensive to carry out. Furthermore, most pistons are made from an aluminum material and such material acts as an abrasive on the inner tip of the cutter in making said annular groove. A further disadvantage of the Ballard method is that it does not provide a final square piston groove since a dished spacer ring is used and this spacer ring is adapted to be seated in the aforementioned annular groove which is wider than the dished spacer ring with a resultant unevenness around the lower inner face of the spacer ring and an uneven groove. Accordingly, it is a primary object of the present invention to provide a novel means and method for resurfacing the upper and lower face of a ring groove in a piston to bring the groove back to its normal condition in an efficient and quick manner.

It is a further object of the present invention to provide a novel means and method for re-sizing a piston ring groove wherein the resultant groove is provided with a spacer ring on the upper side thereof and wherein the bottom face of the groove is tapered inwardly and upwardly whereby the spacer ring may be seated against the upper side of the groove in a flattened condition to provide a square groove. The spacer ring of the present invention is provided with a plurality of projections which cooperate with the sloping bottom face of the ring groove to resist any tendency of the spacer ring to be moved downwardly from its position against the upper side of the groove. The tapered bottom face of the ring groove may be formed with a conventional shaped cutting tool.

It is another object of the present invention to provide a spacer ring structure for use in re-sizing a ring groove in a piston which is compact and simple in construction, economical of manufacture and easy to mount on a piston.

Other objects, features and advantages of this invention will be apparent from the following detailed description and appended claims, reference being had to the accompanying drawing forming a part of the specification wherein like reference numerals designate corresponding parts of the several views.

In the drawing:

Fig. 1 is a fragmentary side elevational view of the upper end of a piston showing the application of the invention to the upper side of the upper ring groove;

Fig. 2 is a fragmentary elevational sectional view of the piston structure of Fig. 1, taken within the circle marked 2, and showing a fragment of an engine cylinder block with piston rings mounted in the piston ring grooves;

Fig. 3 is a top plan view of a piston ring groove spacer ring employed in the invention;

Fig. 4 is a horizontal sectional view of the structure illustrated in Fig. 1, taken along the line 4—4 thereof, and looking in the direction of the arrows;

Fig. 5 is an elevational sectional view of the structure illustrated in Fig. 3, taken along the line 5—5 thereof, and looking in the direction of the arrows;

Fig. 6 is a fragmentary elevational sectional view of a piston showing the upper piston ring groove thereof being machined and provided with an inwardly and upwardly tapered bottom face by means of a cutting tool;

Fig. 7 is a side elevational view of the cutting tool shown in Fig. 6, taken in the direction of the arrows 7;

Fig. 8 is a top plan view of a punch employed in the invention for seating the spacer ring in place in the upper piston ring groove;

Fig. 9 is a side elevational view of the punch illustrated in Fig. 8; and,

Fig. 10 is a fragmentary elevation sectional view of a piston showing a spacer ring being mounted in the upper piston ring groove.

Referring now to the drawing and in particular to Figs. 1 and 2, the numeral 10 generally designates a piston provided with a spacer ring in accordance with the principles of the invention. The numeral 11 indicates a fragment of a cylinder in which the piston 10 is adapted to reciprocate. The piston 10 is provided with the usual expanding type piston rings as 12, 13 and 14 which are adapted to be carried in the grooves 15, 16 and 17, respectively.

The upper ring groove 15 is shown provided with a spacer ring generally indicated by the numeral 18, in accordance with the invention. The bottom face 19 of the groove 15 is provided with an inwardly and upwardly tapered or sloping surface which may be formed by a conventional type cutting tool 20.

The cutting tool 20 is provided with a tapered cutting end 21 having a tapered end face formed to the angle of taper desired to be cut in the groove bottom face 19. The tool 20 merely cleans and squares the lower side face of the groove 15 and removes only enough stock from the upper side face thereof to equal the thickness of the spacer ring 18. The only stock necessary to be removed from the bottom face of the groove is the part shown in Fig. 6 between the dotted line 27 and the tapered face 19. The tool 20 may be made from conventional tool steel to a thickness equal to the final desired groove width and with the proper tapered end to prepare the groove 15 for the spacer ring 18 with one cutting operation.

As shown in Fig. 3, the spacer ring 18 is of the contracting type and may be made from any suitable resilient metal, as for example, spring steel or the like. As shown in Fig. 3, the ends 28 and 29 of the spacer ring 18 overlap each other in the free state and this ring has the usual or normal dished areas which are a natural occurrence when straight ribbon steel is formed into a circular body. However, when the spacer ring 13 is mounted on the tapered face 19, the ring will be stretched, this will eliminate the dished areas as shown in Fig. 4.

As shown in Figs. 2, 3 and 5, the spacer ring 18 is provided with a plurality of punch points 22 or the like which force a projection 23 of metal inwardly. As shown in Figs. 8, 9 and 10, a special mounting punch 24 is adapted to force the spacer ring 18 inwardly onto the tapered bottom face 19. The projections 23 engage the sloping or tapered surface 19 and tend to grip the same to hold the spacer ring 18 securely in place against the upper end face of the ring groove as indicated by the numeral 30 in Fig. 2. As shown in Figs. 8 and 10, the inner end 25 of the punch tool 24 is curved similar to the curvature of the bottom surface of the ring grooves. The mounting punch 24 is also provided with the step 26 for seating of the spacer ring 18 during seating of the same in the groove 15. The mounting punch 24 would first be used to drive in the central portion opposite the spacer ring ends 28 and 29 and then the ends would be driven in place. When the spacer ring is properly seated in place against the upper end groove face, all dishing will be eliminated to provide a square ring groove. The projections 23 resist any tendency of the spacer ring 18 to be driven down the tapered bottom face 19 in use. The forces of inertia acting on the moving piston plus the operational combustion pressures in relation to the ring and the upper part of the piston groove will assist in the permanent seating of the spacer ring against the upper side of the groove surface, thereby making the spacer a fixed part of the piston.

Experience has shown that a more efficient sealing operation is accomplished when using a spacer ring constructed as described above. It will be understood that the spacer ring construction of the present invention may also be incorporated in new pistons to provide long and efficient service life.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. A method of providing a piston ring groove with a spacer ring comprising the steps of: providing the bottom face of the groove with an inwardly and upwardly tapered surface; and, mounting a spacer ring in said groove against the upper end surface thereof and against the tapered bottom face so as to fix the spacer ring in place to become a fixed part of the piston.

2. A piston having a ring groove; said groove having an inwardly and upwardly tapered bottom face; and, a spacer ring of a material harder than the material of the piston mounted in said groove on said tapered bottom face and having one side thereof seated against the upper end surface of the groove and secured in place, whereby the spacer ring becomes a fixed part of the piston.

3. A piston having a ring groove; said groove having an inwardly and upwardly tapered bottom face; a spacer ring of a material harder than the material of the piston; said spacer ring having a plurality of lateral projections on the inner side thereof when the spacer ring is in the free state; and, said spacer ring being mounted in the groove and against the upper end surface and bottom tapered surface of the groove with said projections engaging said tapered bottom surface to secure the spacer ring in place, whereby the spacer becomes a fixed part of the piston.

References Cited in the file of this patent

UNITED STATES PATENTS

| | | |
|---|---|---|
| 2,365,725 | Phillips | Dec. 26, 1944 |
| 2,815,255 | Philips et al. | Dec. 3, 1957 |
| 2,851,317 | Greifenstein | Sept. 9, 1958 |